United States Patent [19]

Hart

[11] Patent Number: 5,650,705

[45] Date of Patent: Jul. 22, 1997

[54] APPARATUS AND METHOD FOR CONTROLLING CURRENTS IN AN INDUCTOR

[76] Inventor: John Roger Hart, 1239 E. Weber Dr., Tempe, Ariz. 85281

[21] Appl. No.: 387,610

[22] Filed: Feb. 13, 1995

[51] Int. Cl.$^6$ ............................................. G05B 11/01
[52] U.S. Cl. .............................. 318/635; 318/671; 363/74; 363/98
[58] Field of Search ............................ 318/625, 638, 318/685, 696, 254, 635, 138, 806, 803, 811, 671, 433, 632; 323/312, 359, 356; 363/74, 78, 95, 97, 98

[56] References Cited

U.S. PATENT DOCUMENTS

| | | | |
|---|---|---|---|
| 4,262,336 | 4/1981 | Pritchard | 364/474.11 |
| 4,518,907 | 5/1985 | Giguere | 318/696 |
| 4,535,405 | 8/1985 | Hill et al. | 318/254 |
| 4,641,069 | 2/1987 | Fujioka et al. | 318/625 |
| 4,688,162 | 8/1987 | Mutch et al. | 363/80 |
| 4,713,716 | 12/1987 | Takemura et al. | 361/23 |
| 4,734,847 | 3/1988 | Hunter | 364/174 |
| 4,743,824 | 5/1988 | Andersson | 318/696 |
| 4,749,931 | 6/1988 | Kegel et al. | 318/696 |
| 4,855,660 | 8/1989 | Wright et al. | 318/696 |
| 4,908,562 | 3/1990 | Back | 318/696 |
| 4,929,879 | 5/1990 | Wright et al. | 318/696 |
| 4,958,117 | 9/1990 | Kerkman et al. | 318/806 |
| 5,079,494 | 1/1992 | Reichard | 318/811 |
| 5,151,640 | 9/1992 | Sakamoto et al. | 318/696 |
| 5,245,522 | 9/1993 | Kawaguchi et al. | 363/37 |
| 5,296,787 | 3/1994 | Albrecht et al. | 318/433 |
| 5,377,497 | 1/1995 | Powell | 361/22 |

*Primary Examiner*—John W. Cabeca
*Attorney, Agent, or Firm*—Donald J. Lisa

[57] ABSTRACT

A motor control system (10) for controlling a multiple number of motors, each motor having a multiple number of phases. System (10) can be used to dynamically vary the step sizes from microsteps to full steps (i.e. "syncro-stepping the motor"). System (10) comprises current drivers (30,31) for controlling current in the motor windings, signed comparators (40,41) for providing a charge and a discharge comparison of actual currents to desired currents, current control state machines (50,51) for controlling drivers (30,31) in a respective operational state, a timing state machine (60) for controlling drivers (30,31) in a desired timing mode, digital-to-analog converters (90,91) for converting digital values to analog signals that correspond to desired currents, a microcomputer (70) that receives external commands from an outer loop and processes them in a unique inner loop software process which controls position, velocity, acceleration, and step sizes of motor (10) by generally using an interrupt rate (110), velocity register (120), adder 130), and position register (140), and a timer (71)for providing timing to the overall system (10).

28 Claims, 5 Drawing Sheets

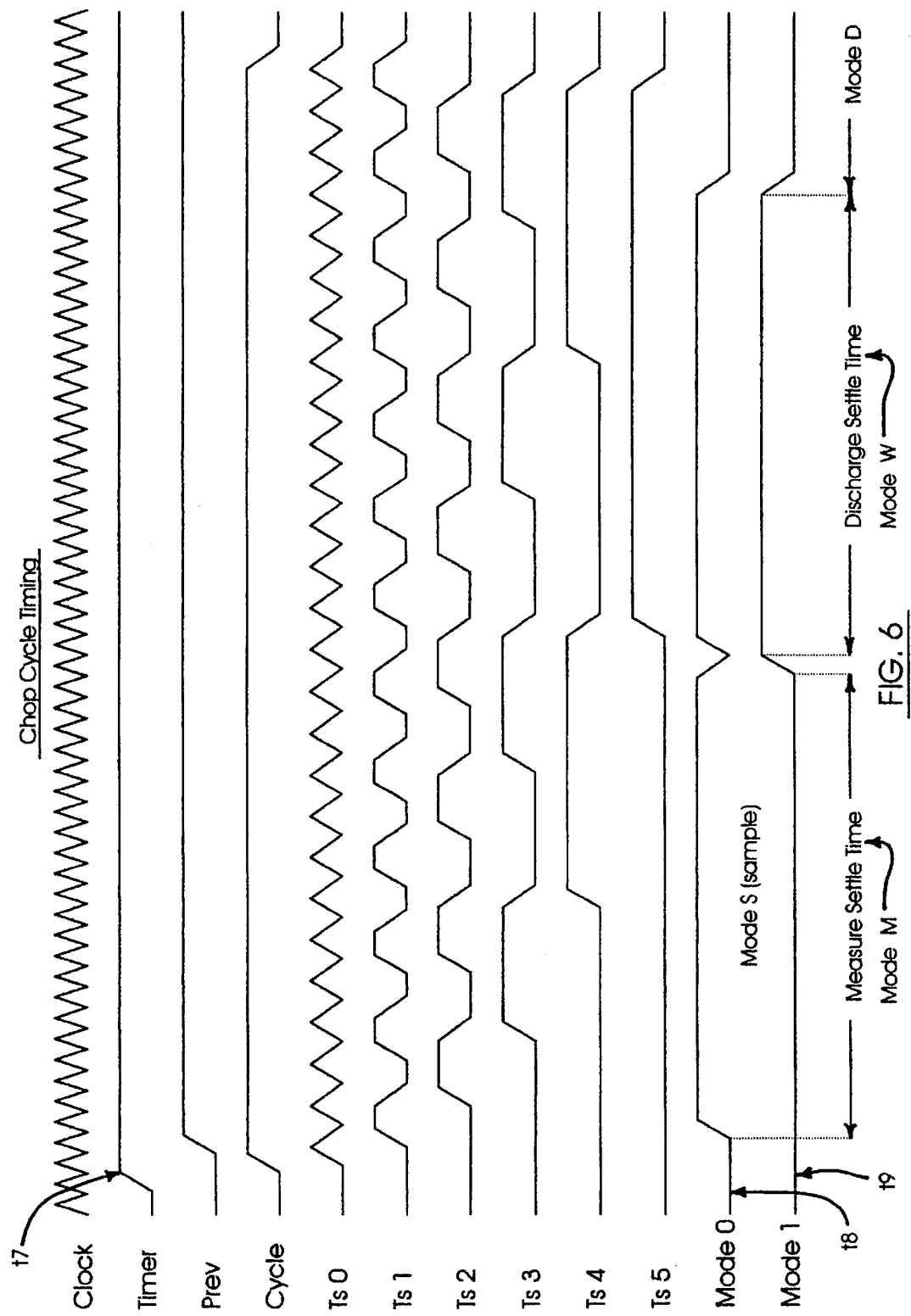

APPARATUS AND METHOD FOR CONTROLLING CURRENTS IN AN INDUCTOR

BACKGROUND OF THE INVENTION

1. Fields of the Invention

The present invention relates to current controllers of inductors and to motors with inductive windings and motion control, and, more particularly, to an apparatus and method of controlling motion by controlling the drive currents in the motor windings of the motor which produces the motion.

2. Discussion of Background and Prior Art

The control of a motor position is accomplished by controlling the current through the two or more inductive windings that create the magnetic fields necessary for the motor's operation. Many circuits have been designed to control motor winding currents and to solve the problems of power switch control. Some H-bridge drivers do not recirculate current through the viewing resistor or current measuring device, so current cannot be measured when in the recirculate mode. Switching transients are large and must be filtered to prevent them from affecting the mode of operation. The control of motor current is dependent on many factors including inductance, velocity, load, and power supply voltage. With an H-bridge driver, the added complexity of motor commutation must also be factored into the current control solution. Therefore, there is a need for, and it is an object of the present invention to provide, an improved solution to the problems associated with regulating the winding current in motors and inductive devices generally.

Presently, stepping and micro-stepping motors are used in a variety of applications. Micro-stepping motors are particularly useful in applications which require fairly fine (i.e. small) movements while stepping motors are typically used in applications which require coarser (i.e. larger) movements.

For example, a contour milling machine may require very precise coordinated motion on multiple axes while a drill may just need to get to a desired position as rapidly as possible before beginning a precise single axis move. When moving at a slow pace, micro-stepping creates smooth, precise motion, but when going at a fast pace, it provides little or no benefit and causes the control processor to approach its computational limit.

Therefore, there is a need for, and it is an object of the present invention to provide, an apparatus or method for controlling a motion causing motor in such a manner that the step sizes of the motor may be dynamically varied from micro-steps to full steps during the motion process.

Prior art U.S. Pat. No. 4,743,824 to Andersson ("Andersson") and, prior art U.S. Pat. No. 4,908,562 to Back ("Back") disclose a method and apparatus for the micro-stepping of a two-phase stepping motor for controlling the magnitude and direction of the current through a motor winding wherein the driver is operated to provide one of three different operational states, (i.e. charge, hold, or discharge). The circuit timing for operating the Andersson apparatus is achieved by using analog means (i.e. a ramp generator, a set of comparators, and the input voltage). The circuit timing for operating the Back apparatus is determined by the clock rate, the clock pulse width, and a delay device (i.e. uses a one-shot circuit to control timing).

Prior art U.S. Pat. No. 4,749,931 to Kegal ("Kegal") discloses a method and apparatus for controlling the magnitude and direction of the current through a motor winding wherein the controller is operated in one of two different operational states (i.e. charge or discharge). The circuit timing for operating the Kegal apparatus is determined by a clock and a comparator.

Kegal discloses a method that makes a decision to charge or discharge current into the motor winding on each clock pulse and continues in the selected mode until the next clock pulse. In this method, the period of the charge or discharge of current is determined by the clock frequency.

Back discloses a method that uses a viewing resistor in series with the motor winding and a differential amplifier to translate the measured current to a ground reference so that motor current can be measured while in the hold state. A mixture of synchronous and asynchronous logic that is clocked off both edges of the clock pulse in conjunction with a delay device comprises the timing control circuit.

Anderson discloses a method that uses a viewing resistor in the return lead of an H-bridge switch to measure the current flow to the motor winding. A current comparator decides if the current is over the desired value and another creates a timing signal that is used to inhibit the current comparison. The control circuit comprises an asynchronous flip/flop used to maintain the operating mode along with miscellaneous logic to resolve the sign of the current.

Back and Andersson both disclose a pulse width modulation method where the control cycle is initiated by the clock, timed by internal parameters, and terminated by the output of a comparator. Kegal, on the other hand, discloses a bucket brigade approach where a current is sourced or sinked for a fixed time after each clocked decision. These prior art patents, however, are limited to the control of motors based on internal parameters, and they do not disclose systems that use state machines or in which external commands or states are fed to the control module (i.e. a mealy state machine with command inputs, comparator inputs, a phase input and feedback from the present state which results in synchronized control of motor current). Since the feeding of external commands to the driver module would result in more direct control of the motor, such a system is highly desired.

Also, these prior art patents do not disclose a central timing control for the system so that all system timing parameters are generated from a common source which gives precise control of the timing and noise associated with multiple drivers switching their operational state. Back and Andersson have further limitations in that they require a number of separate means to filter switching transients, and this is disadvantageous in that the noise of switching transients will affect the operation of adjacent modules. Therefore, there is a need for, and it is an object of the present invention to provide, a timing apparatus which creates a common timing for digitally filtering switching transients and controlling the times when current samples are going to be taken to determine whether a charge or discharge cycle is required.

Prior art methods of comparing currents have the further limitation of not being able to distinguish whether a positive or a negative current is being compared (i.e. do not teach a method of signed comparison). The prior art comparators are limited in that they do not allow separate current comparisons for sourcing current to and sinking current out of the motor windings. Therefore, the problem of current runaway is possible in some discharge cycle techniques resulting in driver or motor damage. Furthermore, a signed comparison method would control current more precisely since the current can be measured during discharge. Furthermore, dual (i.e. signed) comparison allows the charge and discharge current limits to be biased to allow for more symmetrical operation of the circuit. Therefore, there is a need for, and it is an object of the present invention to provide, an apparatus for controlling current in an inductive device by performing signed comparisons of the desired currents with the actual currents in the inductive device. Stepping motors is one of many typical applications.

Finally, the prior art has also made use of a variety of computer algorithms to set parameters and calculate variables needed to execute external computer commands. It is known in the art to have computer algorithms that make use of a position register, a velocity register, an acceleration register, and a timed interrupt source. One limitation, however, of using an acceleration register is that it requires more calculations in the inner loop that is activated at a high rate. This uses up the computational resources of the processor which, in effect, means that additional microprocessors may be needed in order to perform all of the calculations. Therefore, there is a need for, and it is an object of the present invention to provide, a method for controlling a motor that makes use of a computer algorithm in which the acceleration register and associated acceleration calculations are eliminated.

It is an object of the present invention to overcome the problems and limitations of the prior art and to satisfy the needs that have just been identified and discussed.

It is a further object and advantage of the present invention to provide an apparatus and method that can better control a motor having multiple phases.

SUMMARY OF THE INVENTION

Set forth below is a brief summary of the invention in order to solve the foregoing problems and achieve the foregoing and other objects, benefits, and advantages in accordance with the purposes of the present invention as embodied and broadly described herein.

In one aspect of the present invention a current controller is adapted to be coupled to a current driver circuit for providing driving current to an inductive device wherein the improvement includes a current control state machine adapted to be coupled to the current driver circuit for controlling the current driver circuit in a desired operational state, and a signed current comparator adapted to be coupled to the current driver circuit and having an output coupled to the current control state machine for comparing the actual charge and discharge current value in the winding relative to a desired charge and discharge current value. The output of the signed comparator is indicative of the operational state of the driver current, namely, whether the current has exceeded a positive limit or is still exceeding a negative limit.

A further feature of this aspect of the invention is the signed comparator has, a current measuring device adapted to be coupled between the driver circuit at one end and the supply voltage at the other end, a charge limit sense circuit coupled between the one end of the current measuring device and a desired current source, and a discharge limit sense circuit coupled, at one end, to a summation circuit coupled between the desired current source and the charge limit sense circuit and, at the other end, to the other end of the current measuring device.

Another aspect of the present invention is a timing state machine having an output coupled to the current control state machine for controlling the current driver circuit in a desired timing mode.

Another aspect of the present invention is a digital-to-analog converter coupled to the signed comparator for converting a desired current digital value to a desired current analog value for its respective inductive device.

Another aspect of the present invention is the current control state machine and the signed comparator comprising a current control circuit adapted to be coupled to the current driver circuit, a microcomputer adapted to receive external commands and coupled to the digital-to-analog converter for generating the digital value corresponding to the desired current value for the inductive device and further coupled to the current control circuit for providing a phase value of an output waveform for determining the proper polarity of the desired current, and a timer coupled to the microcomputer and to the timing state machine for generating the desired timing mode for the current driver circuit of the inductive device.

Another aspect of the present invention is a data control state machine coupled to the microcomputer, to the current control state machine and to the digital-to-analog converter for performing a desired digital current value look-up function and outputting those values to the current control state machine and digital-to-analog converter.

Another aspect of the present invention is the microcomputer having a velocity register for storing a velocity value and an interrupt rate register for storing an interrupt rate representative of a change in position predetermined by information provided by an external command, an adder, and a position register having a stored value representative of an initial position of the inductive device to which the velocity value is added by the adder to provide a new stored value representative of a new position of the inductive device, the rate at which the values are added being determined by the interrupt rate.

Another aspect of the present invention is the method of storing a value representative of an initial position of the motor, extracting from information provided by an external command a velocity value and an interrupt rate representative of a change in position of the motor, separately storing the velocity value and the interrupt value, adding the velocity value to the initial position stored value to provide a new stored value representative of a new position of the motor, and determining the rate at which the values are added based on the value of the interrupt rate.

BRIEF DESCRIPTION OF THE DRAWINGS

FIG. 6—A diagram showing the chop cycle timing of the system in which the timing modes are derived from the internal states of the counting timer in the FIG. 1 system.

DETAILED DESCRIPTION OF THE PREFERRED EMBODIMENT

Figure 1:
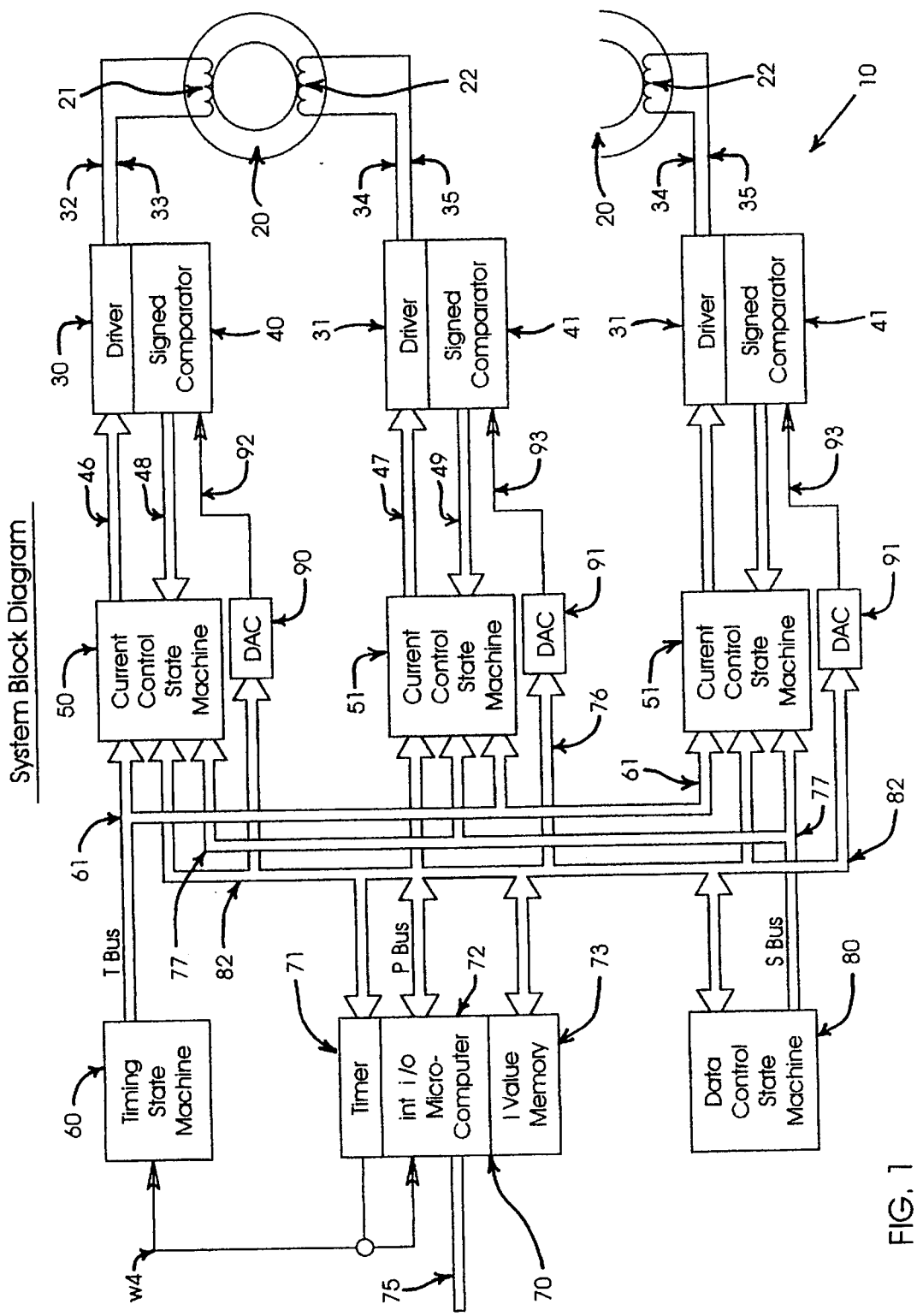
FIG. 1—A system block diagram of one embodiment of the apparatus for controlling a motor in accordance with the invention and for explaining the method in accordance with the invention.

As stated earlier, the prior art does not disclose an apparatus or method for controlling a motor in which the step sizes of the motor are dynamically varied during acceleration from microsteps to full step. The present invention defines this method of controlling a motor (i.e. varying the step sizes) as "syncro-stepping the motor". FIG. 1 shows a system 10 which can be used to syncro-step the motor. System 10 is designed so that it can control a multiple number of motors, each motor having two or more of phases.

OVERVIEW

FIG. 1 shows system 10 controlling a number of motors 20, wherein each motor 20 has windings 21, 22. System 10 generally has current drivers 30, 31 for controlling current in the windings 21, 22, signed comparators 40, 41 for performing a charge and a discharge comparison of actual current in each of the windings 21, 22 to a desired current value, current control state machines 50, 51 for controlling the drivers 30, 31 by deriving a new operational state from the present operational state and other input parameters, a centralized timing state machine 60 for controlling the drivers 30, 31 in a desired timing mode, digital-to-analog converters 90, 91 for converting digital values to analog signals that correspond to desired current values for each of the windings 21, 22, a microcomputer 70 capable of receiving external commands 75 representative of a desired motor position and generating the digital values corresponding to desired current values for windings 21, 22 and for providing a phase value of the rotary position of rotor windings 21, 22 so that the proper polarity of the desired current is determined, and a counter/timer 71 for providing an overall rate at which system 10 operates. Windings 21, 22 are simply inductors and may be the inductive winding of a wide variety of electrical applications. Winding 21, for example, may be a speaker coil.

CURRENT DRIVERS

Figure 2:
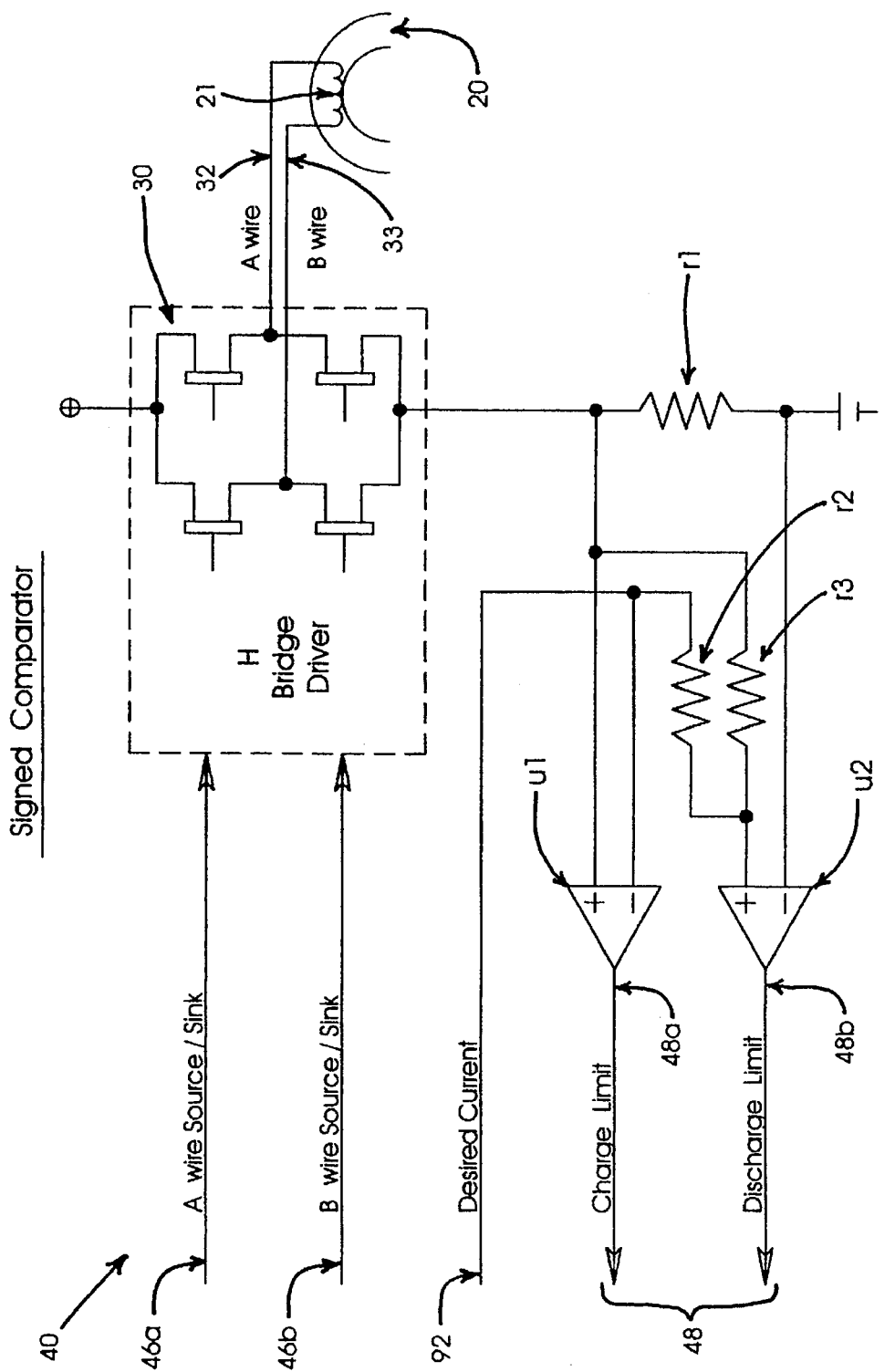
FIG. 2—A circuit diagram of the signed comparator in the FIG. 1 System, which is used for providing a charge comparison and a discharge comparison of currents in the motor to desired current values in accordance with the present invention.

The current driver 30 from system 10 is attached to winding 21 by connecting one output 32 of the driver 30 to one pole of the winding 21 and another output 33 of the driver 30 to the other pole of the winding 21. A second current driver 31 from system 10 is attached to the second winding 22 by connecting one output 34 of the driver 30 to one pole of the winding 22 and another output 35 to the other pole of the winding 22. Current drivers 30, 31 control or drive the amount of current respectively in windings 21, 22. Current drivers 30, 31 can be H-Bridge drivers, as shown in FIG. 2.

SIGNED COMPARATORS

Signed comparators 40, 41 are respectively connected to current drivers 30, 31. FIG. 2 shows one embodiment of a circuit diagram of signed comparator 40 connected to current driver 30. Signed comparators 40, 41 provide a charge (i.e. positive) and a discharge (i.e. negative) comparison of actual current in each of the windings 21, 22, respectively, relative to the desired current value. The output 48 of signed comparator 40 comprises output 48a of comparator u1 which provides a charge limit from a charge comparison and output 48b of comparator u2 which provides a discharge limit from a discharge comparison.

The sensed current from the driver 30 is viewed by both comparators u1, u2 via a current measuring device, for example, viewing resistor r1. Generally speaking, the current going through viewing resistor r1 is positive except when current is being pulled out of the winding 21. Resistor r1 is connected to comparators u1, u2 and driver 30 so that it can be used to measure the current in winding 21 during the charge and discharge states of the motor 20. It should also be noted that the current through the motor 20 cannot be measured during a hold state (i.e. neither charging or discharging) since there is no current flowing through viewing resistor r1 during this state. It should be further noted that system 10 takes care of the commutation of the winding current (i.e. the indication of the polarity of the current through the winding 21) outside of the realm of the viewing resistor r1.

Signed Comparators 40 and 41 are respectively connected to current drivers 30 and 31. FIG. 2 shows a circuit diagram 40 of signed comparator 40 connected to current driver 30. The current flowing through driver 30 is sensed by resistor r1. The voltage across sense resistor r1 is proportional to the current flowing through winding 21 while driver 30 is on. If driver 30 is causing the current in winding 21 to increase the voltage across sense resistor r1 will be positive. If driver 30 is causing the current in winding 21 to decrease the voltage across sense resistor r1 will be negative.

Charge limit comparator u1 has one of its inputs connected to the sense voltage from r1 and the other input connected to the voltage associated with the desired current 92 from DAC 90 in FIG. 1. The output of comparator u1 goes true if the current sensed by r1 is greater that the desired current 92. Discharge limit comparator u2 has one of its inputs connected to ground and the other connected to the common node of the summing network comprised of r2 and r3. The output comparator u2 goes true when the common node of the summing network r2 and r3 goes negative. If the sense voltage from resistor r1 divided by the value of r2 is greater that the voltage from DAC 90 divided by the value of r3 the common node will be negative and the output of comparator u2 will be true.

CURRENT CONTROL STATE MACHINES

Current control state machines 50, 51 are respectively attached to drivers 30, 31 and signed comparators 40, 41. Current control state machines 50, 51 respectively receive the two outputs 48 (i.e. outputs 48a and 48b as shown in FIG. 2) from signed comparators 40, 41. Furthermore, current control state machines 50, 51 are connected to the processor and the data control state machine 80 for controlling commutation of the windings.

Current control state machines 50, 51 determine a respective operational state for the drivers 30, 31. Drivers 30, 31 can be maintained in one of three operational states: a charge state, a hold state, and a discharge state. If the magnitude of the actual current in the winding is less than a desired value, then the drivers 30, 31 are maintained in the charge state wherein current is being sourced from the supply to the motor winding (i.e. windings 21, 22). When the magnitude of the actual current becomes equal to the desired value, then drivers 30, 31 are put into the hold state wherein current is being recirculated in the motor winding. If the magnitude of the actual current is greater than the desired value, then drivers 30, 31 are maintained in the discharge state wherein current is being pulled from the winding into the supply.

The commutation of the winding current is handled by swapping the output states of the A wire 46a and B wire 46b, which is coming from the current control state machine 50. Therefore, current control state machines 50, 51 maintain the drivers 30, 31 in the present desired operational state and determine the next desired operational state based on the comparison of the actual current to the desired current, the present operational state of the drivers, the commutation state, and a timing mode provided by the timing state machine 60.

TIMING STATE MACHINE

Figure 4:
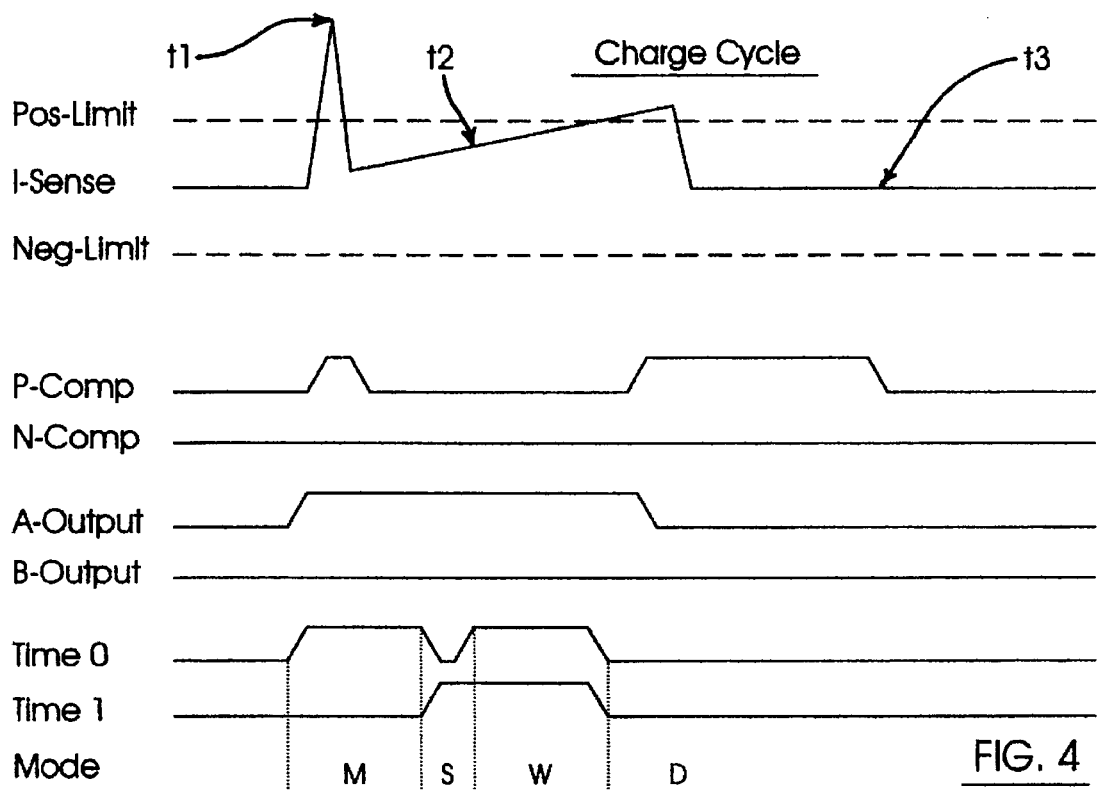
FIG. 4—A diagram showing states of the signed comparator output and driver circuit output during the charge cycle of the motor during the various timing modes in the FIG. 1 system.
Figure 5:
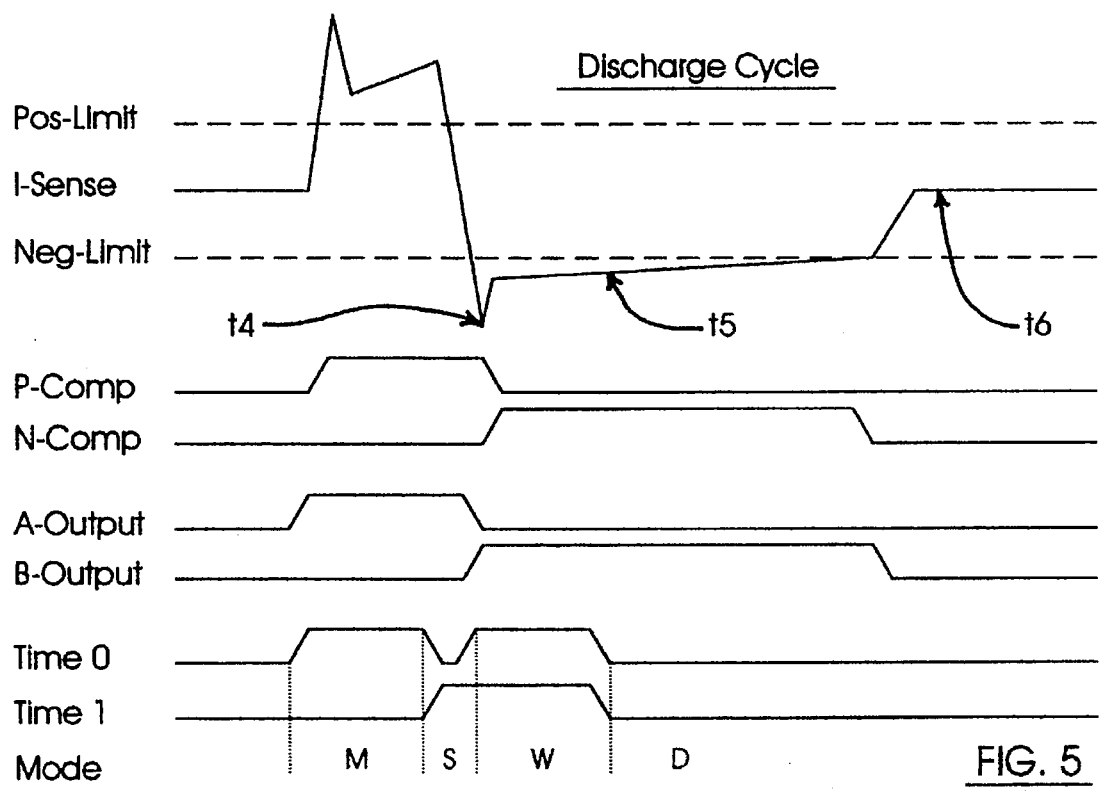
FIG. 5—A diagram showing states of the signed comparator output and driver circuit output during the discharge cycle of the motor during the various timing modes in the FIG. 1 system.

The timing state machine 60 is connected to current control state machine 50 via bus line 61. Timing state machine 60 is also connected to the timer 71 (See FIG. 6—t7). Timing state machine 60 creates the timing for the digital filtering of noise from switching transients, and it controls the sequencing of the operational states of the current control state machines 50. The timing state machine 60 outputs one of four timing modes, which are represented by, but not limited to, a two bit code (See FIG. 6—t8 and t9), to the current control state machine 50: a measure mode, a sample mode, a settle mode, and a detect mode. In FIGS. 4-6, it should be noted that when using sense resistor (r1) in the driver common to measure current, the positive comparison and positive limit correspond to the charge comparison and charge limit, and the negative comparison and negative limit correspond to the discharge comparison and discharge limit without regard to motor commutation. If using a remote sense resistor with a differential amplifier to measure current, the meanings of the comparisons will swap depending on the commutation state.

In the measure mode (See FIGS. 4 and 6—Mode M), the driver is put into the charge state and then waits until the switching transients settle (See FIG. 4—t1). Next, the sample mode (See FIGS. 4 and 6—Mode S) is output which keeps the driver in the charge state if the actual current in the winding is less than the desired current value (FIG. 4), or will put the driver into the discharge state (with concurrent swapping of the output states of the A and B wires) when the actual current in the winding is greater than the desired current value (FIG. 5). This mode occurs for only one clock period because currents will be changing after the sample is taken. In the wait mode (See FIGS. 5 and 6—Mode W), the driver waits for the discharge switching transients (See FIG. 5—t4) to settle if the current driver circuit has been put into the discharge state. Otherwise, it acts the same as the detect mode (FIG. 4). The next mode is the detect mode which operates in one way in the charge state (See FIGS. 4 and 6—Mode D) and in another way in the discharge state (See FIG. 5—Mode D). If the current control state machine 50 is in the charge state, then that state is maintained until the current in the winding becomes greater than the charge limit (See FIG. 4—t2) and then it is put into the hold state (See FIG. 4—t3) awaiting the next measure mode command from the Timing State Machine. If the current control state machine 50 is in the discharge state, then that state is maintained until the summation of the desired current and the actual current (node between r2 and r3 in FIG. 2) in a corresponding inductive device becomes positive (i.e., the t5 ramp in FIG. 5 crosses the negative limit) and then it is put into the hold state (See FIG. 6—t6) awaiting the next measure mode command from the Timing State Machine. As a further note, during the hold state, the winding current does not go through the viewing resistor r1 in FIG. 2.

FIGS. 4 and 5 are respectively timing diagrams of the charge cycle and discharge cycles, which show the current sensed in the motor 20, the P-N outputs (i.e. charge and discharge outputs) of the comparator 40, and the A-B outputs of the current control state machine 50 during the corresponding timing modes.

MICROCOMPUTER

As shown in FIG. 1, microcomputer 70 comprises a microprocessor 72 and a memory storage 73. The output of timer 71 is connected to the timing state machine 60, and is used to initiate a chop cycle (See FIG. 6—t7). The output of timer 71 is also attached to an interrupt on the microprocessor 72. Microcomputer 70 executes algorithms to generate digital values that correspond to a desired position according to external commands inputted 75 to the microprocessor. The digital values are used to enter a look up table to obtain the corresponding desired current values that are associated with the desired position. A data control state machine 80 can be used in conjunction with the microcomputer 70 to look up the current values corresponding to the desired position for the different phases of the motor. The use of such a state machine 80 reduces the amount of time needed by the microprocessor 72 to look up the digital current values corresponding to the desired positions (i.e. I value). The desired current digital values are then fed by the data control state machine 80 into the current control circuits 30, 40, 50, 31, 41, 51 (FIG. 1) via bus 82, 76 or are sent directly into the digital-to-analog convertor by taking control of the processor bus 82. The desired current digital values may be sent directly by the microprocessor 72 to the digital-to-analog converters 90, 91 (FIGS. 1,2) if the data control state machine function is incorporated in microprocessor 72. In the latter case converters 90 and 91 then convert the desired current digital values to corresponding analog signals that can be respectively fed to windings 21, 22 and to signed comparators 40, 41. Microcomputer 70 also derives the polarity of the desired current (i.e. two upper bits of register wherein the one upper bit is used for one phase of the motor and the XOR of the two bits is used for the other phase of the motor).

The microcomputer 70 receives external commands and parameters from an input output device 101 and outer loop process (See FIG. 3) via I/O port 75 (FIG. 1). The outer loop process builds packets of information 103 based on the external commands and parameters that are used by the inner loop software process 100. The inner loop software process 100 (shown in FIG. 3) uses the information in the packets to set the value of the velocity register 120 and interrupt rate register 110, which controls the overall system timing. The inner loop process 100 will process the packet every time the microcomputer 70 is interrupted until that packet is exhausted (i.e. packet exhaustion is controlled by outer loop process).

SYSTEM OPERATION

The operation begins with initialization of system parameters. First, the I (current) value memory storage 73 is filled with values that correspond to the desired currents associated to corresponding motor positions (i.e. determined from characteristics of motor). Additionally, there is a means for indexing into a plurality of different tables to optimize the behavior of the motor over ranges of torque and speed requirements.

Figure 3:
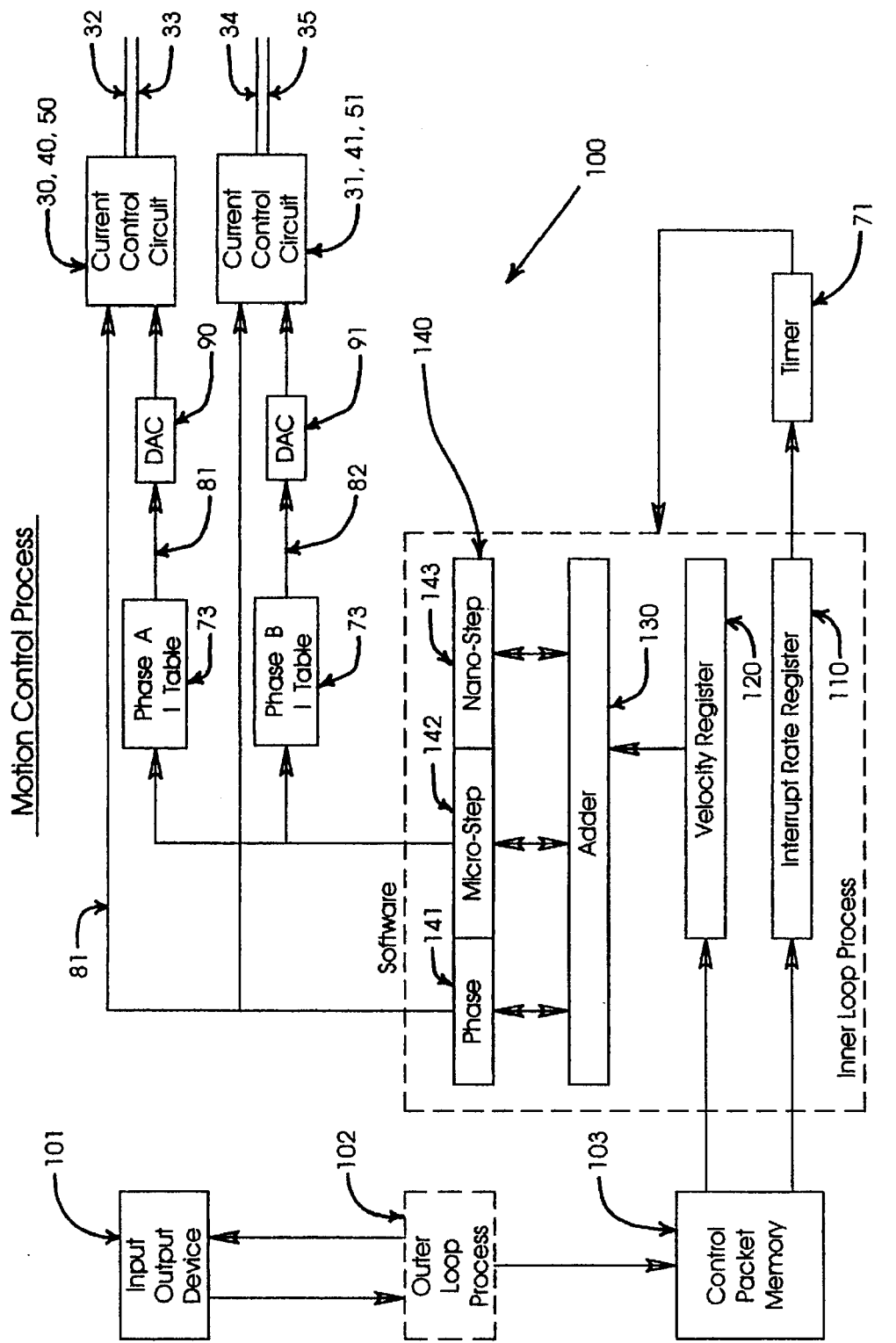
FIG. 3—A block diagram showing the motion control process which comprises a software process and implemented software process in the FIG. 1 system.

As shown in FIG. 3, the inner loop software process 100 controls the speed of the motor 20. The motor speed is the product of the frequency of the interrupts times the value in the velocity register 120. The values in the velocity register and the interrupt rate register are changed after each motion control packet is exhausted. In the preferred embodiment the interrupt rate 110 of microcomputer 70 is maintained for a predetermined number of interrupts. The operating process further makes use of a velocity register 120, an adder 130, and a position register 140.

The position register 140 consists of a phase register 141, a microstep register 142, and a nanostep register 143. A first or initial position of the motor 20 is defined by its phase and microstep values (i.e. position values), and these position values of motor 20 are stored in the position register 140 as a first or initial set of values. A second or changed position of the motor is defined by the outer loop software process and is represented by the velocity value stored in the velocity register 120 and the interrupt rate value stored in the interrupt rate register 110 of the inner loop software process 100. On each active interrupt, the value in the velocity register 120 is then added to the position value in the position register 140. Therefore, the interrupt rate 110 controls the velocity of the motor since it controls the speed at which the velocity values are added to the position values to change the position of the motor to the next desired position. For each next desired position desired current value is then determined from the data control state machine 80 and the memory storage 73 for the new position value.

Furthermore, system 10 is unique in that acceleration of the motor 20 is controlled by the outer loop software process varying the value in the interrupt rate register and the value in the velocity register. Therefore, system 10 does not need an acceleration register, and the time associated with adding it to the velocity register in the inner loop is eliminated providing a significant and substantial savings in computational time and capacity over prior art machines.

The step or microstep sizes of the motor 20 can be controlled or varied by two ways. The first method is to decrease the interrupt rate 110 by a factor predetermined by the outer loop and increase the value in the velocity register by the same factor in order to increase the step size, and to increase the interrupt rate 110 by a factor predetermined by the outer loop and decrease the value in the velocity register by the same factor in order to decrease the step size. The second method is to provide another register that would cause interrupts of the microprocessor 72 to be skipped. By skipping more interrupts, the stepping rate is in effect decreased, and by skipping less interrupts, the stepping rate is in effect increased. The second method has the advantage of reducing the precision of the calculations, and therefore, the amount of time necessary needed within the inner loop.

When a motion command is issued to the microcomputer 70, then the microprocessor 72 loads up the timer 71 to initiate the microprocessor 72. A motion command is issued by the outer loop software, and the outer loop builds up the packet of information for the inner loop software process 100. The packet of information contains all of the information needed to control the inner loop process 100 for whatever period of time and at the desired interrupt rate and velocity value defined by the outer loop process.

The foregoing description of a preferred embodiment and best mode of the invention known to applicant at the time of filing the application have been presented for the purposes of illustration and description. It is not intended to be exhaustive or to limit the invention to the precise form disclosed, and obviously many modifications and variations are possible in the light of the above disclosure. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims hereto.

I claim:

1. In a current controller constructed and configured to couple to a current driver circuit and to supply driving current to an inductive device using a measure of current as its primary source of feedback without relying on sensors for position or load wherein the improvement comprises:

a current control state machine which is constructed and configured to couple to the current driver circuit and which is responsive to current and timing signals received at an input of the current control state machine representative of externally commanded positions to control the current driver circuit in desired operational charge, hold and discharge states in synchronism with desired sequential timing modes, and a signed current comparator constructed and configured to be coupled to the current driver circuit and having an output coupled to the current control state machine for comparing the actual charge and discharge value of current in the inductive device relative to a desired charge and discharge current value whereby control of the inductive device is implemented in a closed loop by evaluating current feedback data and modifying the state of the current control state machine in response thereto.

2. The current controller of claim 1 wherein the signed comparator further comprises an output indicative of the operational state of the driver current, namely, whether the current is more positive than a positive limit or is more positive than a negative limit.

3. The current controller of claim 2 wherein the signed comparator further comprise:

a viewing resistor adapted to be coupled between the driver circuit at one end and the supply voltage at the other end, a charge limit sense circuit coupled between the one end of the resistor and a desired current source, and a discharge limit sense circuit coupled, at one end, to a summation circuit coupled between the desired current source and the charge limit sense circuit and, at the other end, to the other end of the viewing resistor.

4. The current controller of claim 1 further comprising:

a synchronized timing state machine having an output coupled to the input of the current control state machine and supplying the timing signals for controlling the current driver circuit in the desired sequential timing mode.

5. The current controller of claim 1 further comprising:

a digital-to-analog converter coupled to the signed comparator for converting a desired current digital value to a desired current analog value for its respective inductive device.

6. The current controller of claim 1 wherein the operational state of a current driver circuit is a charge state in which current is being supplied to a corresponding winding.

7. The current controller of claim 1 wherein the operational state of the current driver circuit is a hold state in which current is being recirculated in a corresponding inductive device.

8. The current controller of claim 1 wherein the operational state of the current driver circuit is a discharge state in which current is being removed from a corresponding inductive device.

9. The current controller of claim 1 wherein the charge comparison done by each signed current comparator determines whether the actual current in the inductive device is greater than a charge limit value that is based on the desired current value.

10. The current controller of claim 1 wherein the discharge comparison done by each signed current comparator determines whether the actual current in the inductive device is more positive than a discharge limit value that is based on the desired current value.

11. The current controller of claim 4 further comprising:
the current control state machine and the signed comparator comprising a current control circuit when coupled to the current driver circuit,
a digital-to-analog converter coupled to the signed comparator for converting a desired current digital value to a desired current analog value for its respective inductive device,
a microcomputer constructed and configured to receive external commands and coupled to the digital-to-analog converter for generating the digital value corresponding to the desired current value for the inductive device and further coupled to the current control circuit to supply a phase value of an actual output waveform for determining the proper polarity of the desired current, and
a central timer coupled to the microcomputer and to the timing state machine for synchronously generating the desired timing mode and synchronously controlling the operational states of the current driver circuit of the inductive device.

12. The current controller of claim 11 further comprising:
a plurality of current control circuits each of which is coupled to the timing state machine and the microcomputer and are adapted for controlling the current in a plurality of inductive devices.

13. The current controller of claim 11 wherein the inductive devices are windings of a multi-phase motor.

14. The current controller of claim 13 further comprising:
synchro-stepping means for dynamically varying the step sizes of the motor whereby the motor is microstepped at slower speeds and stepped at higher speeds.

15. The current controller of claim 11 further comprising:
a data control state machine coupled to the microcomputer, to the current control state machine and to the digital-to-analog converter for performing a desired digital current value look-up function and outputting those values to the current control state machine and digital-to-analog converter.

16. The current controller of claim 15 wherein the data control state machine further comprises:
a logic circuit for deriving the polarization of the desired current in the inductive device.

17. The current controller of claim 11 wherein a data state machine is included within the microcomputer which is coupled to the digital-to-analog converter coupled to the current control circuit.

18. The current controller of claim 17 wherein the digital-to-analog converter is also coupled to the signed comparator.

19. The current controller of claim 11 wherein the microcomputer further comprises:
a microprocessor having an interrupt for processing received commands and generating desired positions of the inductive device and a memory for storing the desired current values corresponding to the desired positions, and
wherein the timer controls an interrupt of the microprocessor and execution of the timing state machine.

20. The current controller of claim 11 wherein the microcomputer further comprises:
a velocity register for storing a velocity value and an interrupt rate register for storing an interrupt rate representative of a change in position predetermined by information provided by an external command,
an adder,
a position register having a stored value representative of an initial position of the inductive device to which the velocity value is added by the adder to provide a new stored value representative of a new position of the inductive device, the rate at which the values are added being determined by the interrupt rate.

21. The current controller of claim 4 wherein the desired timing mode of the current driver circuit is a measure mode in which the current driver circuit is put into a charge state and then waits until switching transients settle.

22. The current controller of claim 4 wherein the desired timing mode of the current driver circuit is a sample mode in which the current driver circuit is kept in the charge state when the actual current in a corresponding inductive device is less than the desired current value or is put into a discharge state when the actual current in a corresponding inductive device is greater than the desired current value.

23. The current controller of claim 4 wherein the desired timing mode of the current driver circuit is a wait mode in which the current driver circuit waits for switching transients to settle when the current driver circuit is in a discharge state and, when the current driver circuit is in a charge state, waits and performs as a detect mode maintaining the charge state until the actual current in a corresponding inductive device becomes greater than the magnitude of the desired current value.

24. The current controller of claim 4 wherein the desired timing mode of the current driver circuit
in the charge state is a detect mode in which the current driver circuit is put into a hold state if the magnitude of the actual current in a corresponding inductive device becomes greater than the magnitude of the desired current value and
in the discharge state is a detect mode in which the current driver circuit is put into a hold state if the summation of the desired current and the actual current in a corresponding inductive device becomes positive.

25. In a method of controlling current in a current driver circuit constructed and configured to supply driving current to an inductive device without using feedback of position or load wherein the improvement comprises the steps of:
inputting current and timing signals representative of externally communicated positions to a current controlled state machine constructed and configured for coupling an output thereof to the current driver circuit,
controlling the current driver circuit in response to the output from the current controlled state machine in desired operational charge, hold and discharge states in synchronism with desired sequential timing modes, and
comparing the actual charge and discharge current value in the inductive device relative to a desired charge and discharge current value in a signed current comparator constructed and configured to couple to the current driver circuit and having an output coupled to the current control state machine whereby control of the inductive device is implemented in a closed loop by evaluating current feedback data and modifying the machine state in response thereto.

26. A method of controlling a multi-phase motor having at least two windings without the use of position feedback comprising the steps of:

(a) centrally generating and synchronizing desired timing modes and operational states for a current driver circuit coupled to each winding, (b) generating in a microcomputer constructed and configured to receive external commands a digital value corresponding to the desired current value for each winding and providing a phase value of an actual rotor position for determining the proper polarity of the desired current, (c) sequentially maintaining each current driver circuit in a desired timing mode including a measure mode, sample mode, wait mode and detect mode in synchronism with desired operational charge, hold and discharge states, (d) converting the desired current digital value to a desired current analog value for each winding, and (e) independently controlling the current in each of at least two motor winding circuits by supplying driving current to the motor winding, and comparing an actual charge and discharge current value in the winding relative to a desired charge and discharge current value in a signed comparator which separately detects the state of the actual winding current relative to a positive limit and a negative limit.

27. The method of claim 26 further comprising the steps of:

storing a value representative of an initial position of the motor, extracting from information provided by an external command a velocity value and an interrupt rate representative of a change in position of the motor, separately storing the velocity value and the interrupt value, adding the velocity value to the initial position stored value to provide a new stored value representative of a new position of the motor, and determining the rate at which the values are added based on the value of the interrupt rate.

28. In a method of controlling a multi-phase motor having a plurality of windings with a microcomputer adapted to receive external commands which includes controlling the current in each winding by comparing the actual current value in each winding to a desired current value for each winding to determine a new current for each winding wherein the improvement comprises the steps of:

storing a current value representative of an initial position of the motor, extracting from information provided by the external command a velocity value and an interrupt rate representative of a new current value for a changed position of the motor, separately storing the velocity value and the interrupt value, adding the velocity value to the initial position stored value to provide a new stored value representative of the new position of the motor, and adding the values at a rate proportional to the interrupt rate.

* * * * *